United States Patent [19]
Hines

[11] Patent Number: 6,122,455
[45] Date of Patent: Sep. 19, 2000

[54] LENSLESS VIEWFINDER AND LENSLESS VIEWFINDER CAMERA

[76] Inventor: Stephen P. Hines, 4525-B San Fernando Rd., Glendale, Calif. 91204

[21] Appl. No.: 09/169,744

[22] Filed: Oct. 8, 1998

Related U.S. Application Data

[63] Continuation-in-part of application No. 08/859,868, May 21, 1997, abandoned
[60] Provisional application No. 60/036,249, Jan. 24, 1997.
[51] Int. Cl.$^7$ ..................................................... G03B 13/08
[52] U.S. Cl. ................................ 396/385; 396/6; 396/375
[58] Field of Search .............................. 396/6, 373, 375, 396/378, 379, 380, 381, 385, 386

[56] References Cited

U.S. PATENT DOCUMENTS

| | | |
|---|---|---|
| 1,678,493 | 7/1928 | Albada . |
| 2,187,057 | 1/1940 | Sauer ....................................... 396/386 |
| 2,217,930 | 10/1940 | Zimmerman ............................. 396/386 |
| 3,380,336 | 4/1968 | Papke ....................................... 396/386 |
| 4,697,901 | 10/1987 | Wakabayashi et al. .................. 396/377 |
| 5,335,033 | 8/1994 | Ruben . |
| 5,345,285 | 9/1994 | Hasushita et al. ........................ 396/379 |
| 5,628,039 | 5/1997 | Muramatsu et al. ..................... 396/296 |

*Primary Examiner*—Alan A. Mathews
*Attorney, Agent, or Firm*—John E. Wagner

[57] ABSTRACT

A viewfinder, particularly useful in a camera, is lensless but which provides a useful reticle to aid the user to properly frame the desired scene. A camera body includes a viewfinder front wall opening. Surrounding the front wall opening, on its interior surface is a concave mirror with its focus on a reticle. The reticle on an internal surface of the camera body is located at the interior face of the eyepiece opening region of the viewfinder. Incoming light at the front opening illuminates the reticle and its image is reflected by the concave mirror surface to the user's eye. In one embodiment, the front opening of the camera is a single opening larger than the rear or eyepiece opening, and in another embodiment, the front opening constitutes a series of small holes in the front wall of the camera with the surface between the holes reflectorized and acting as the concave mirror. In another embodiment also adapted particularly for zoom lens cameras, a reticle mask is included within the camera body and is adjustable with the zoom position of the taking lens to change the size of the reticle. This feature includes a pair of movable L-shaped masks, each including an L-shaped reticle and which combine to produce a variable size rectangular reticle.

27 Claims, 9 Drawing Sheets

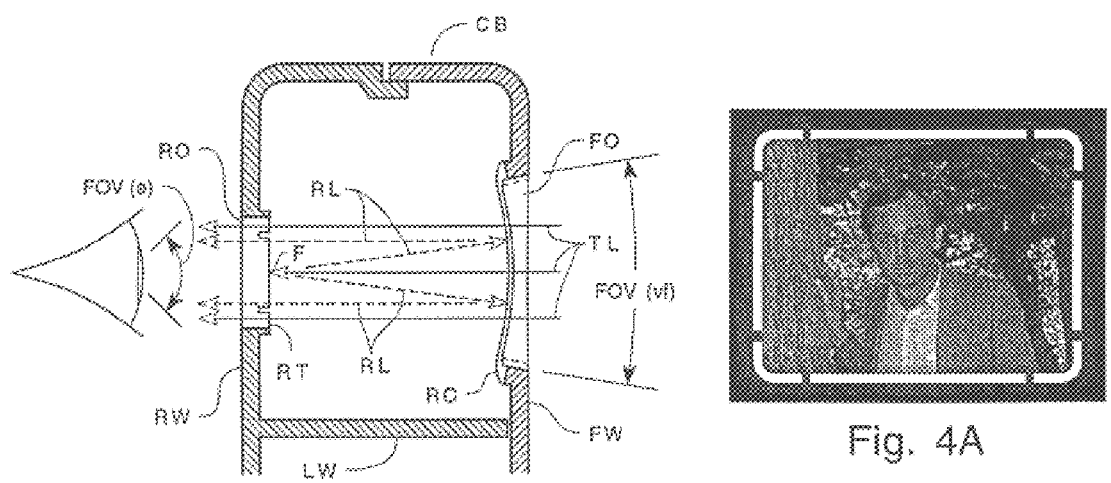
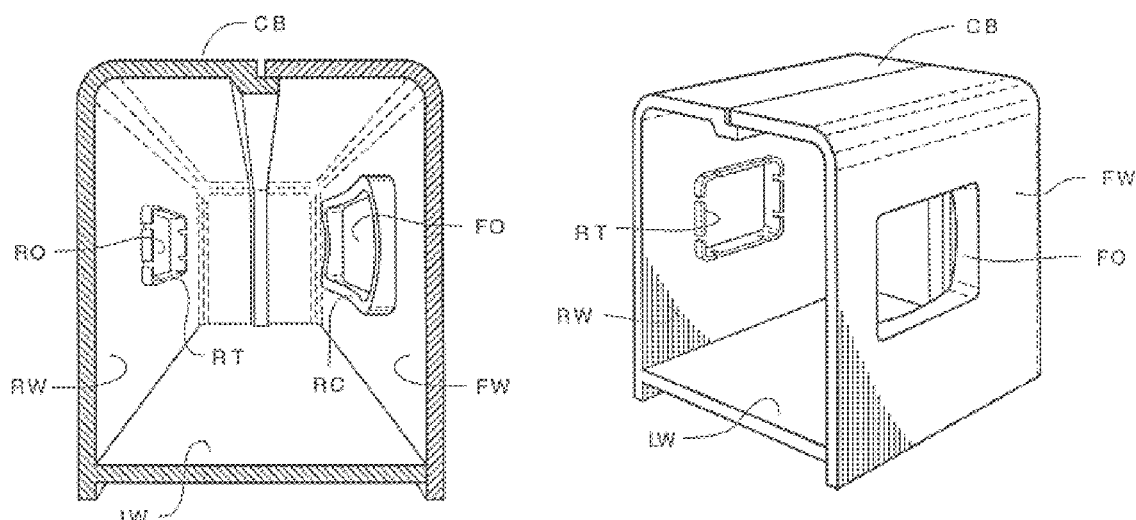

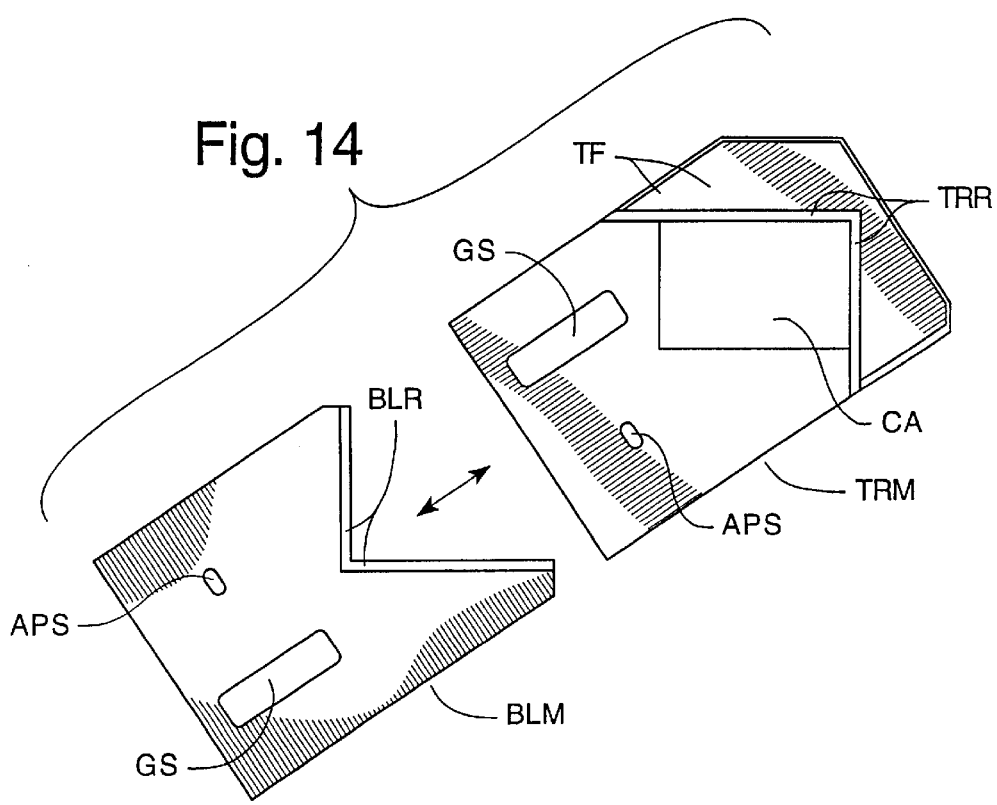
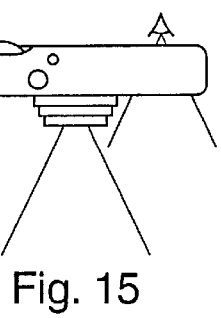
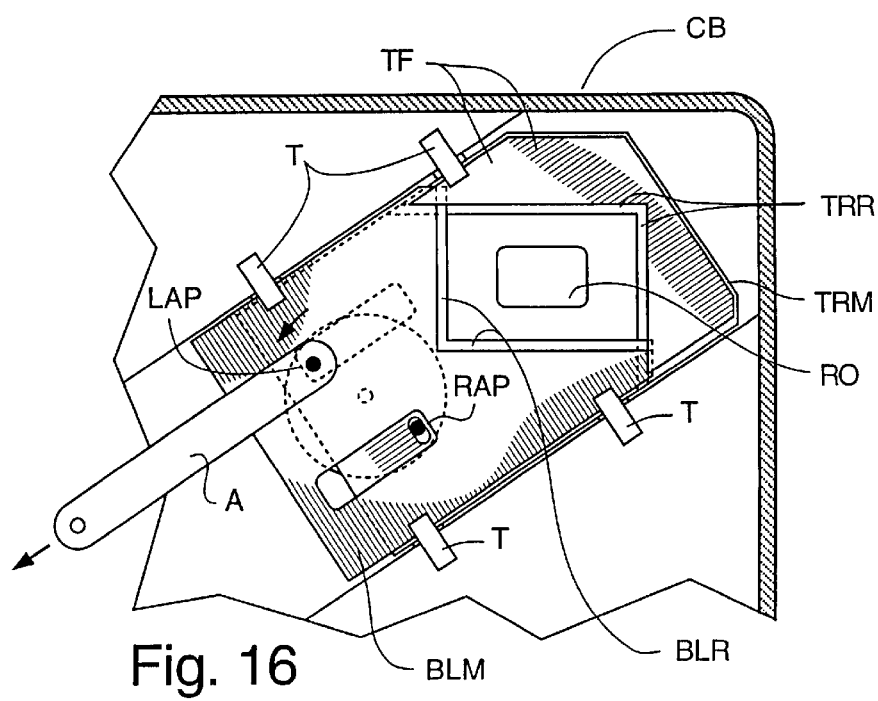

LENSLESS VIEWFINDER AND LENSLESS VIEWFINDER CAMERA

REFERENCE TO RELATED APPLICATIONS

This is a continuation-in-part application of U.S. patent application Ser. No. 08/859,868 filed May 21, 1997, now abandoned, which is a non provisional application based upon provisional application Ser. No. 60/036,249 filed Jan. 24, 1997.

BACKGROUND OF THE INVENTION

Viewfinders find many uses and are of particular importance in cameras to aid the photographer in framing the subject. In the past, very inexpensive viewfinders have not provided an accurate means to indicate to the photographer the aim of the camera. And the most accurate and capable viewfinders, found in $70–300 point-and-shoot cameras, are too expensive for current $9–$15 single-use cameras. In the very least expensive cameras of the single-use camera type, an optical viewfinder is dispensed with, providing only a hole through the camera which provides virtually no accuracy in aiming the camera. In order to provide accurate framing, viewfinders have been used which require the use of a minimum of two lenses, to which reflective optical coatings are added (the Albada viewfinder).

A number of viewfinders have been devised. The following table describes various viewfinders used in simple cameras, including point-and-shoot, and single-use cameras:

Summary of existing low cost viewfinders:

| TYPE | FORMS IMAGE OF FRAME | COMMENTS |
| --- | --- | --- |
| Large hole through camera | No | Pros: costs nothing. Cons: Frame line out of focus. Not accurate. Acceptable for only the least expensive cameras. |
| Small hole in rear wall of camera. Large hole through front. FIG. 1 | No | Comments: Small hole near eye acts as a pin-hole lens. Pros: Image of scene and front frame sharp. No motion parallax between frame and scene. Cons: Not usable by eye-glasses wearers. Image is dim. Has limited field view. |
| Reverse-Galilean Viewfinder, FIGS. 2 and 2A | No | Pros: Relatively inexpensive. Cons: Adds cost of lenses and assembly. Lenses collect dirt, finger prints and scratches. Image is minified making it harder to see Edges of frame are out of focus. Eye motion causes parallax errors. |
| Albada Viewfinder, FIGS. 3 and 3A | Yes | Comments: Created by adding reflective coatings to reverse Galilean viewfinder lenses. Pros: Bright rectangular frame is imaged in the scene. No motion parallax between frame and scene. Cons: Costs of lenses and assembly. Lenses collect dirt, finger prints and scratches. Image is minified making it harder to see. |

The reverse-Galilean viewfinder, FIG. 2, so named because it makes use of one positive and one negative lens, as Galileo used in the first telescope. However, in reverse-Galilean viewfinders, the order of the lenses is reversed which minifies the image.

The Albada viewfinder as illustrated in FIG. 3 uses the same lenses of the reverse Galilean viewfinder, but adds a reflective coating to the concave surface of the negative lens to act as a magnifying mirror. Also a frame or reticle is formed on the interior surface of the positive lens, usually by metal deposition. Two superimposed images are formed, (1) the lenses refract transmitted light to create a minified image of the scene, and (2) some light reflects off of the reticle forward to the concave surface of the front lens, where it is reflected (and focused) rearward to the eye. The images of the scene, and of the reticle, appear to be superimposed at a comfortable viewing distance of about 10 feet.

In each of these types of prior art cameras which are represented in the accompanying drawings, FIGS. 1–3, the field of view of the viewfinder is represented in the vertical dimension as the space between the lines FOV(vf) and typical images seen therein are represented by FIGS. 1A, 2A and 3A, respectively.

The field of view of the user's eye is, of course, larger than that of the camera viewfinder and is represented in these same figures in the vertical plane by the space between the lines FOV(eye).

Many cameras, including low cost point and shoot cameras provide zoom capability. For such applications, a reticle is even more important to accurately frame the photograph.

In the photo finishing business, a cropping aid is used which consists of a pair of planar right angled notched sheets which are movable to define a variable size exposure rectangle. These two sheets, determine the limits of the scene and crop the final reproduction. In certain complex lens type viewfinders similar planar masking devices have been used. This type of adjustment has not, heretofore, been applied to a lensless viewfinder.

BRIEF DESCRIPTION OF THE INVENTION

The subject of this invention relates to a lensless optical viewfinder and camera with a lensless viewfinder which is not only low in cost but provides a reticle which is visible through the viewfinder when the photographer frames the portion of the scene which will appear in the processed picture. The user then can obtain properly framed photos as when using much more expensive cameras.

This is achieved in the preferred embodiment by employing two aligned openings in the camera case in the front and rear walls of the opaque hollow camera body.

The inner surface of the front opening in the camera body is surrounded by a concave mirror surface RC. On the inner surface of the rear wall of the body, surrounding the rear opening RO, is a rectangular frame defining the reticle.

Incident light, from the scene, is transmitted directly through the openings to the user, and also illuminates the reticle which is more reflective than the inside wall of the camera surrounding the rear opening.

The concave mirror, surrounding the inside of the front opening and outside of the viewfinder field of view FOV(vf), reflects and focuses an image of the reticle to the eye of the user who sees the image of the reticle as if it is part of the scene in front of the camera.

The viewfinder of this invention optionally eliminates the need for any refractive material such as lenses or transparent windows in the viewfinder opening.

In the case of a zoom lens camera, the same basic lensless viewfinder is formed in the camera body with its front opening and concave mirror. The reticle, however, is formed in two parts, on diagonally opposite corners of the rear opening, described below.

Within the camera body in the viewfinder optical path are a pair of L-shaped sliding masks which define a variable sized opening. These plates are coupled to the zoom-adjustment mechanism to change their spacing and thus to change the size of the reticle opening to correspond to the field of view of the camera lens.

By comparison with the prior viewfinders discussed above:

| TYPE | HINES' LENSLESS VIEW FINDER | |
|---|---|---|
| | FORMS IMAGE OF FRAME | COMMENTS |
| HINES' lensless perimeter-frame viewfinder, FIGS. 4, 5–7 | Yes | Pros: Bright rectangular frame is imaged in the scene. No lenses used or associated cost. No motion parallax between frame and scene. Image of scene remains full size as in the most expensive SLR's. Costs approximates that of using no viewfinder. Quality suitable for more expensive cameras as well. Cons: --- |
| HINES' lensless perforated-frame viewfinder, FIGS. 8 and 9 | Yes | Pros: Bright rectangular frame is imaged in the scene. No lenses used or associated cost. No motion parallax between frame and scene. Image of scene remains full size as in the most expensive SLR's. Costs approximates that of using no viewfinder. Quality suitable for more expensive cameras as well. Provides a wider field of view of the scene than the reticle, to aid composition. Cons: Scene brightness reduced. Edges of holes creates some diffraction. Accommodates a range of reticle sizes, required by zoom cameras. |
| HINES' lensless variable focal length viewfinder | Yes | Pros: camera provides accurate frame lines, of a size matching that of the zoom lens, without cost of multi element zooming viewfinder lenses. Cons: eye relief is slightly reduced for wide-angle position. |
| All HINES' lensless viewfinders above | Yes | Pros: No image minification. |

This viewfinder is not limited to cameras but may be used in other applications, as well. The single use camera is a prime candidate for its application because of its low cost, ease of incorporation in those products and the fact that it provides a reticle image in the field of view of the user's eye without the use of any refractive elements and without any image minification.

BRIEF DESCRIPTION OF THE DRAWING

This invention may be more clearly understood with the following detailed description and by reference to the drawings in which:

FIG. 4 is a lateral cross sectional view through a camera incorporating my invention including the fields of view of the viewfinder and the user's eye and the light paths of incident light and the reflected light path from the reticle to the concave mirror, and the reflected reticle image to the users eye in dashed lines;

FIG. 4A shows the unminified view through the viewfinder of FIG. 4 with sharply focused reticle;

FIG. 5 is an interior perspective view of the preferred embodiment of my invention of FIG. 4;

FIG. 6 is a partial perspective view of the embodiment of FIGS. 4 and 5;

FIG. 14 is simplified exploded front elevational view of the variable aperture elements of viewfinder of FIG. 13;

FIG. 15 is a reduced size top plan view of a camera of this invention in the wide angle lens and viewfinder position;

FIG. 16 is a fragmentary front elevational view of the changeable aperture feature of my lensless viewfinder on the camera of FIG. 13 when in a wide angle configuration;

DETAILED DESCRIPTION OF THE INVENTION

Figure 1:
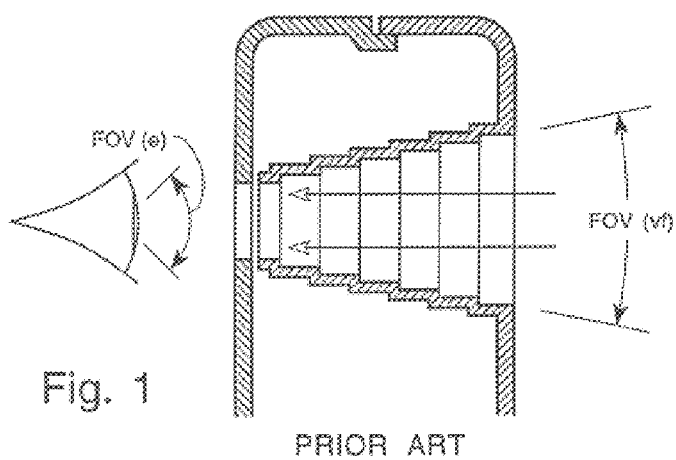
FIG. 1 is a transverse sectional view through a prior art lensless viewfinder having a large opening at the front of a camera and a small eyepiece opening at the rear and a user's eye with the field of view of the viewfinder FOV(vf) and the field of view of the user's eye in the vertical plane defined by limit lines.
Figure 1A:
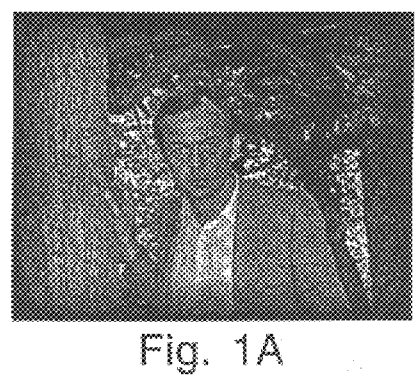
FIG. 1A shows the view through the viewfinder of FIG. 1 with typical soft-focus indistinct frame lines.

Disclosed in the drawing, FIGS. 4, 5–7, 8–9, is my basic viewfinder, which uses no lenses, but which forms a bright image of a reticle at the distance of the scene to be photographed.

Figure 3:
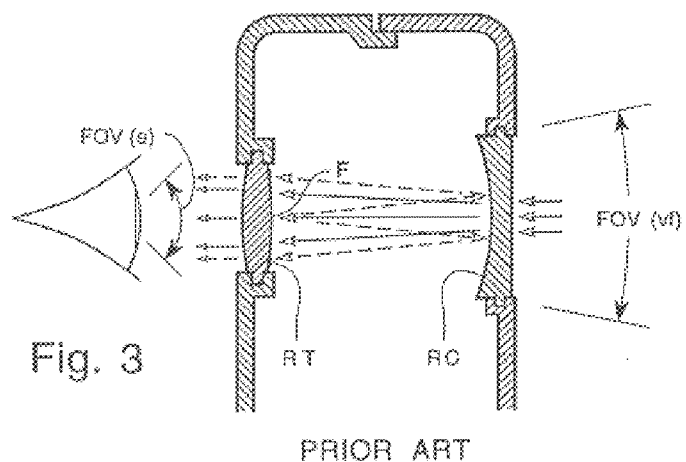
FIG. 3 is a view similar to FIG. 1 of the prior art Albada type viewfinder.
Figure 3A:
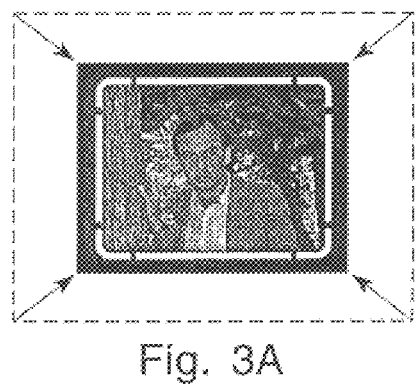
FIG. 3A shows the minified view through the viewfinder of FIG. 3 with superimposed sharply focused reticle.

Transmitted light is represented in FIG. 4 with solid line ray traces TL, and reflected light RL which forms the image of the reticle RT are shown as dashed lines. Note that there are two superimposed optical paths, as in the Albada viewfinder of FIG. 3, for the view of the scene, and the bright-line reticle. My proposed viewfinder uses reflective optics which can be molded as part of the front and rear walls, FW and RW respectively, of the camera body CB [FIGS. 4–6]. Therefore, the viewfinder of my invention requires no additional parts compared to the prior art lensless viewfinder of FIG. 1. The bright image of the subject is shown surrounded by a clear bright reticle in FIG. 4A.

FIG. 4 also illustrates the field of view of a typical human eye as defined by the lines FOV(eye) and the field of view of the viewfinder FOV(vf) as it is defined, both in the vertical plane. A similar relationship exists in the horizontal plane.

It should be noted that the optical path through the viewfinder in the field of view of the viewfinder as defined above is free of any refractive or other optical elements, i.e., an open hole defined by the normal opaque camera body. This means that in the manufacture of cameras employing the invention, the camera body defines the entire viewfinder and it provides a reticle image inside the field of view of the user's eye FOV(eye) and is superimposed upon the field of view of the viewfinder FOV(vf), achieving the same results as more complex and expensive lens viewfinders. Unseen directly by the user is the actual reticle RT located on the inside surface of the rear wall RW, or at least on a front facing surface inside the viewfinder cavity of the camera body CB.

There is no directly exposed transparent surface which may become soiled or scratched, and no subassembly operations for the viewfinder are required in manufacturing. At most, a metalizing operation will be required for the concave mirror and reticle of the viewfinder.

Visible to the viewfinder user is the concave mirror surface RC on the front wall FW or on a rear facing surface surrounding the front opening FO of the viewfinder. This concave mirror RC provides the reticle image viewed by the user without any minification of the image seen through the viewfinder.

In one embodiment of this invention shown in FIGS. 8 and 9 and described below, the front opening FO is actually a number of small openings with the mirrored inner surface on the front wall surrounding the array of small openings.

FIG. 5 shows an interior perspective view of the viewfinder portion of the camera body CB, showing the reticle RT formed around the rear opening, RO, and the concave mirror RC molded as a spherically-curved surface on the inside face of the front opening FO. FIG. 6 shows an exterior of the viewfinder portion of the camera body CB. The reticle/mirror combination RT/RC forms a sharply-focused image of the reticle RT so that it appears to be fixed on and placed into the scene in accordance with well known camera design practice.

The viewfinder of my invention is basically an open hole through the front and rear walls of the camera body. The optical elements of the viewfinder exist only at the perimeters of the openings on the front and rear walls of the camera and outside of the field of view FOV(vf) of the viewfinder. A concave generally spherical surface, is molded on a protrusion on the interior face of the front camera wall FW. The concave surface is preferably flashed with aluminum or other metallizing material to make it a highly reflective surface RC.

The reticle RT is formed similarly on the interior surface of the rear wall RW of the camera body CB, by depositing a reflective frame (the same operation used to create the reflective coating RC on the interior of the front wall FW and incidentally, to create the reticle on the positive lens an Albada viewfinder).

It should be noted that minification of an image, in prior art viewfinders, is not a user advantage, but done for engineering reasons, to be able to use small viewfinder lenses and maintain the field of view which matches that of the camera taking lens. A one-to-one, or full size, image, before my invention has usually been implemented in only the single lens reflex cameras, using a complex and expensive lens and prism system or in the least expensive single use cameras which have not provided sharply focussed frame lenses.

Figure 2:
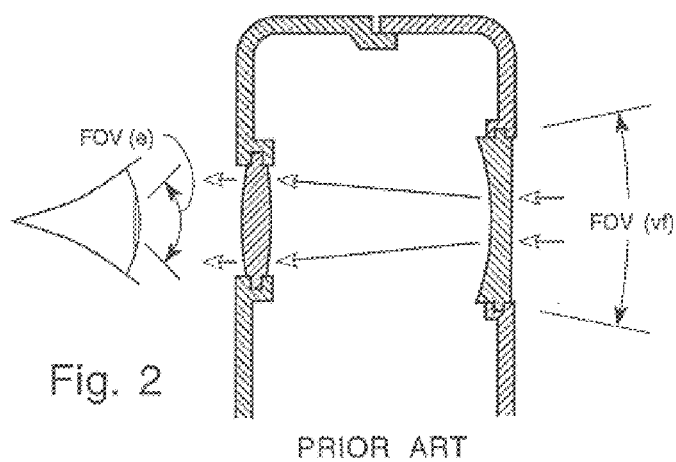
FIG. 2 is a transverse sectional view through a conventional prior art reverse-Galilean viewfinder illustrating the light path and fields of view of the viewfinder and of the user's eye similar to FIG. 1.
Figure 2A:
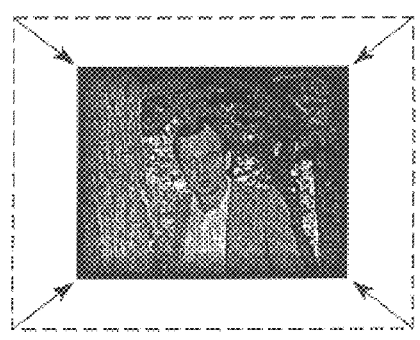
FIG. 2A shows the minified view through the viewfinder of FIG. 2 with soft-focus indistinct frame lines.

The simple prior art hole-type viewfinder of FIG. 1 is incapable of providing a sharply-imaged frame of reference. Use of the reverse-Galilean or Albada viewfinders of FIGS. 2 and 3, respectively, precludes 1:1 size imaging because they use lenses which inherently minify the image.

A variation of the Albada viewfinder could be made in which the front and back glass or plastic elements were curved meniscus elements which had no refractive power; however, this would save no cost over the traditional Albada design.

My proposed lensless viewfinder does not result in minification; however, provides a sharply imaged frame of reference. Thus, my lensless viewfinder provides both simplification and improvement as compared with other basic viewfinders, and costs virtually the same as the simple through-hole type viewfinder, i.e. nothing, except reflective metallizing; however it creates a rectangular frame which appears to be superimposed on the scene.

The reticle RT shown in these drawings, FIGS. 4 and 5, is a raised surface, with the thought that the raising the surface would facilitate printing it with white, or coating it with aluminum to increase its reflectivity. However, the reticle RT can be raised or flush depending on the physical size of the camera and the optical requirements of the viewfinder. A precise smooth surface produced in the injection molding process of the opaque camera body may provide sufficient reflectivity to provide a usable reticle image without metallizing.

Figure 7:
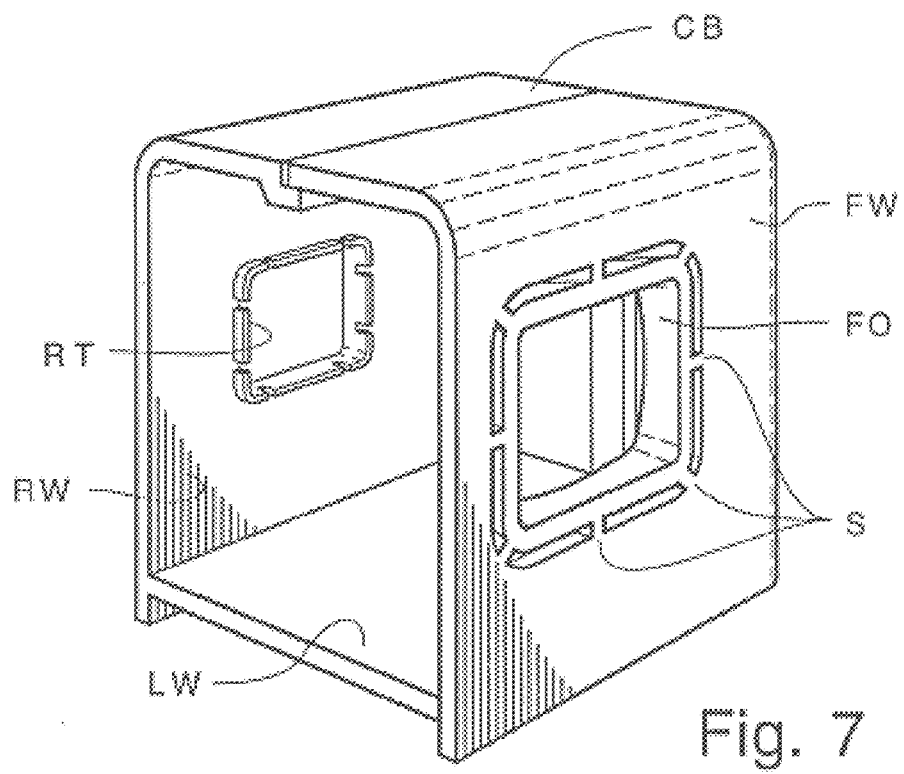
FIG. 7 is a partial perspective view similar to FIG. 6 of an alternate embodiment of my invention.
Figure 7A:
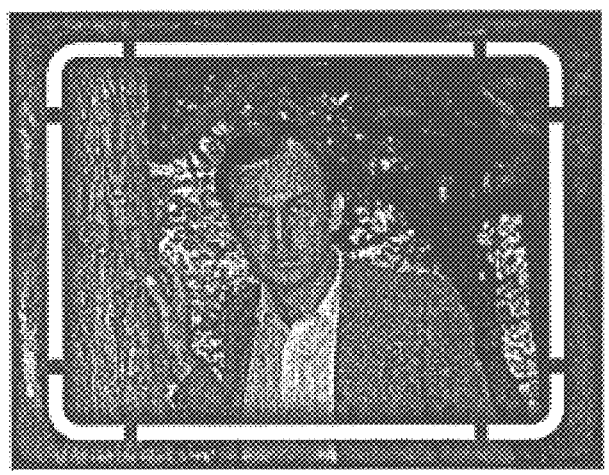
FIG. 7A shows the unminified view of the scene, with sharply focused reticle and slight localized attenuation of the scene due to the radial struts.

It may be desirable to have a viewfinder which shows slightly more of the scene than will actually be photographed, to help the photographer compose the picture. This lensless viewfinder can be configured with the spherical mirror frame in the form of a thin strip generally surrounding the front opening FO and supported on struts S, within a larger opening FO in the front wall FW, as shown in FIG. 7 which is an exterior of the viewfinder portion of the camera body CB. The result of this embodiment is illustrated in FIG. 7A in which a portion of the scene appears surrounding the reticle.

Figure 8:
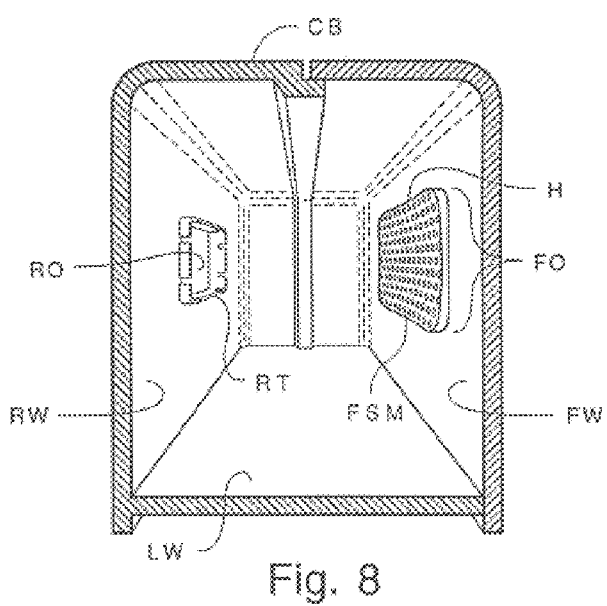
FIG. 8 is an interior perspective view similar to FIG. 5 of another embodiment of my invention employing a different form of front opening.
Figure 9:
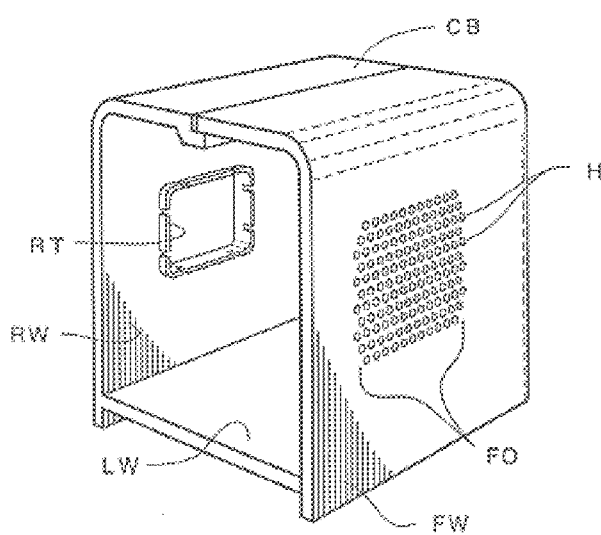
FIG. 9 is a partial perspective view similar to FIGS. 6 and 7 of the embodiment of FIG. 8.
Figure 9A:
FIG. 9A shows the unminified view of the scene with sharply focused reticle.

Another embodiment of my invention, shown in FIGS. 8 and 9, takes the form of the substantially spherical mirror FSM, on the interior face of the front wall FW of camera body CB, being perforated with hundreds of small holes H, approximately 1 mm across, which creates the front opening FO. The holes H, are close enough to the eye to be out of focus and provide an apparent continuous images of the transmitted scene and of the reflected reticle RT. The ratio of holes H to surrounding front wall area FW can be varied to increase the transmitted light, or the reflectance of the rear reticle RT.

All described techniques are aided by the small scale of the optics and supports relative to the diameter of the pupil in the eye. The eye sees the focused image of the projected reticle RT overlapping the scene within the out-of-focus inner edge of the front window FW. However, the structure of the front optics (support struts S in FIG. 7, and small holes H in FIGS. 8 and 9, etc.) are out of focus and do not appreciably interfere with the use of the viewfinder.

Figure 12:
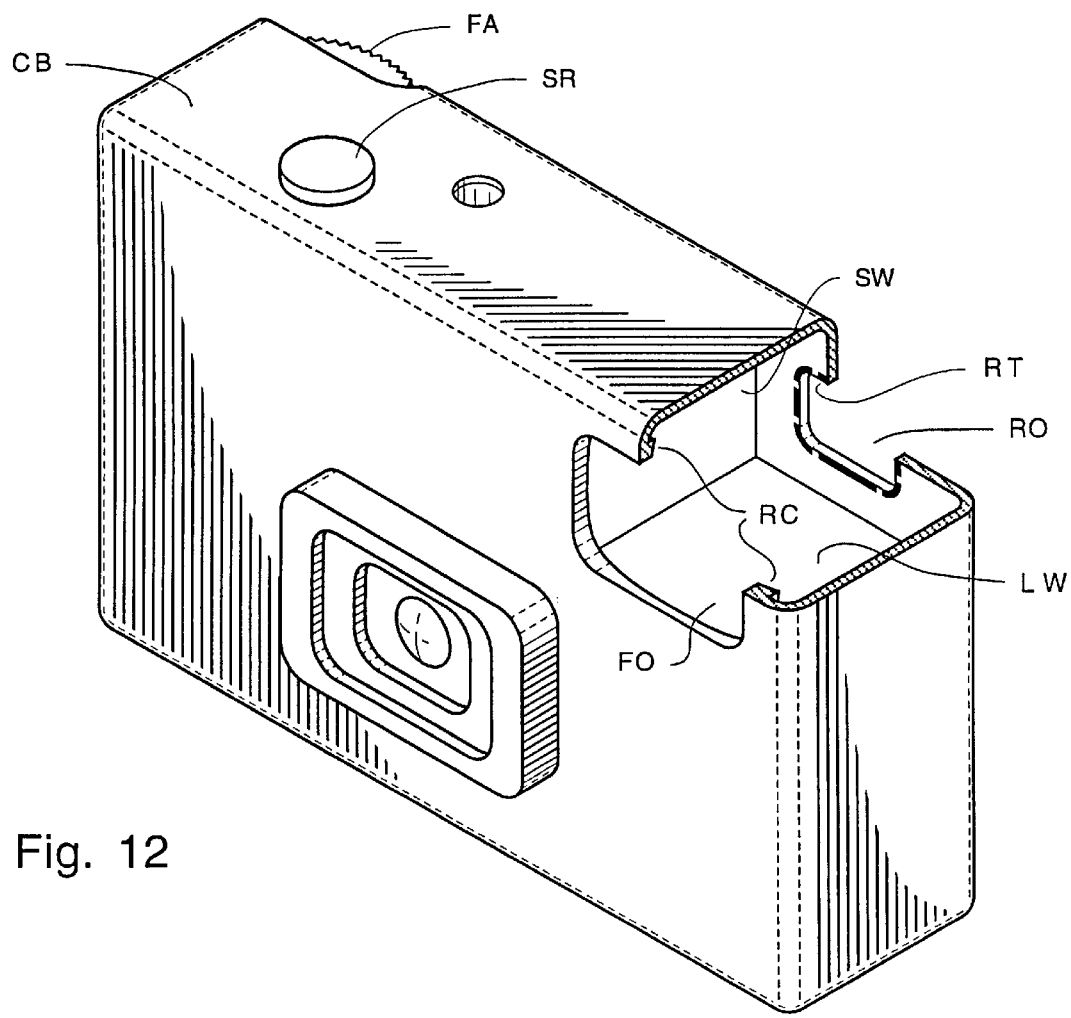
FIG. 12 is a perspective view of a camera with the viewfinder of my invention partly broken away for clarity.

In each of the figures of the drawings showing these embodiments, only the viewfinder portion of the camera is illustrated for clarity of understanding. A typical arrangement in a single use camera is illustrated in FIG. 12. The camera taking lens assembly, the shutter, and film advance, all of which are in accordance with established practice, and constituting image captive means are contained within the camera body CB and sealed from ambient light from the viewfinder reaching the film by internal walls, side wall SW and lower wall LW provide this sealing function. Recognizing that current developments in cameras, digital storage of images replace the conventional film and film advances. Any form of image capture means, film or electronic storage is usable with this invention.

Figure 10:
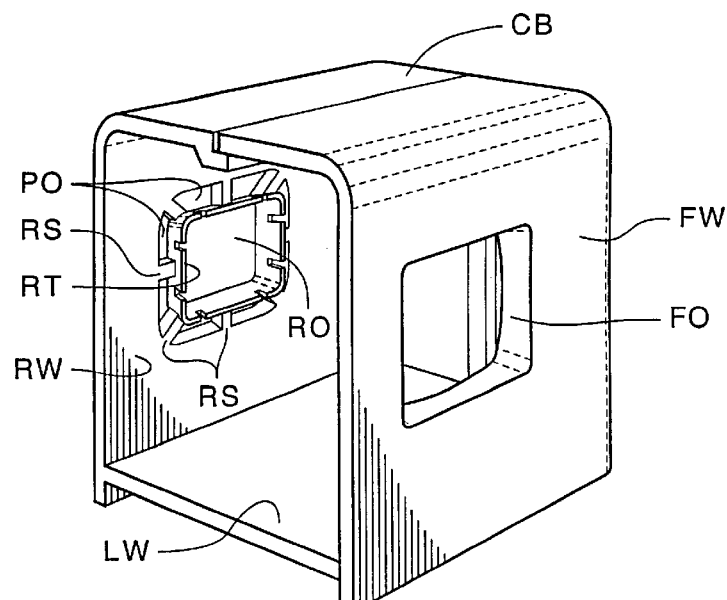
FIG. 10 is a partial perspective similar to FIGS. 6 and 7 of an alternate embodiment of my invention.
Figure 11:
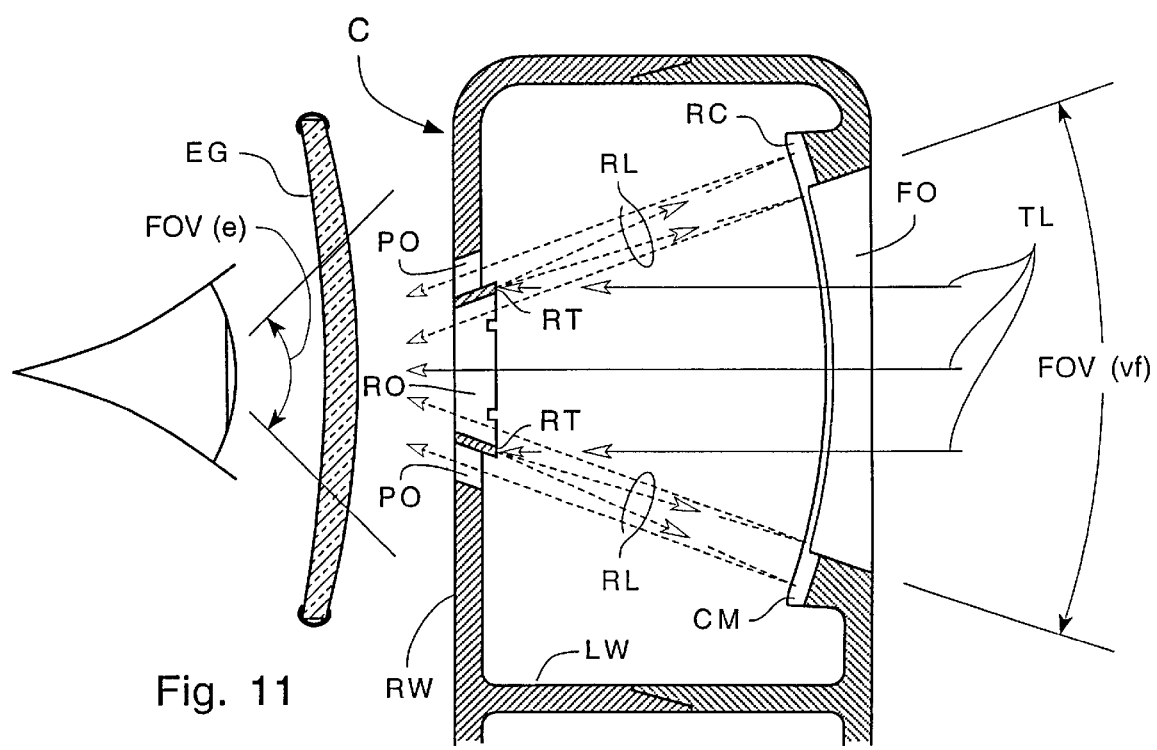
FIG. 11 is a lateral cross-sectional view taken slightly off center to clearly show reflected light passing through a perimeter opening through a camera of the embodiment of FIG. 10 and with a user wearing glasses.

FIGS. 10 and 11 show an embodiment where greater eye relief for the user is provided, particularly useful for eye glass wearers. In this case the reticle RT is supported on radial reticle supports RS of FIG. 10, similar to the mirror supports S of FIG. 7. To minimize obscuration of the reflected image of reticle RT and supports RS, they are molded radial to the optical axis.

This insures minimum observation by the radial supports of the viewed scene.

This allows the user to move the eye without being restricted to view only through the rear opening, and still see the reflected image of the reticle. The reticle is so thin and out of focus as to be un-noticeable.

The reticle supports RS are struts or ribs which extend generally radially with respect to the center of the rear opening. As shown in FIG. 10, the reticle supports RS are preferably located at each corner of the rear opening and mid points of the reticle top, bottom and sides. The reticle RT itself comprises a thin rectangular frame with its major cross section generally paralleling the dashed reflective light ray lines so as to minimize interference with the view of the reticle image outside of the reticle in the perimeter opening PO. This aids the user in framing the subject of the scene whether or not wearing eye glasses.

When this invention is applied to a more complex camera such as one which provides various aspect ratios or zoom operation, there is a need to change the reticle size to provide a matching field of view through the viewfinder, again, without the use of lenses. This is accomplished by the embodiment of this invention as illustrated in FIGS. 13–20.

Figure 13:
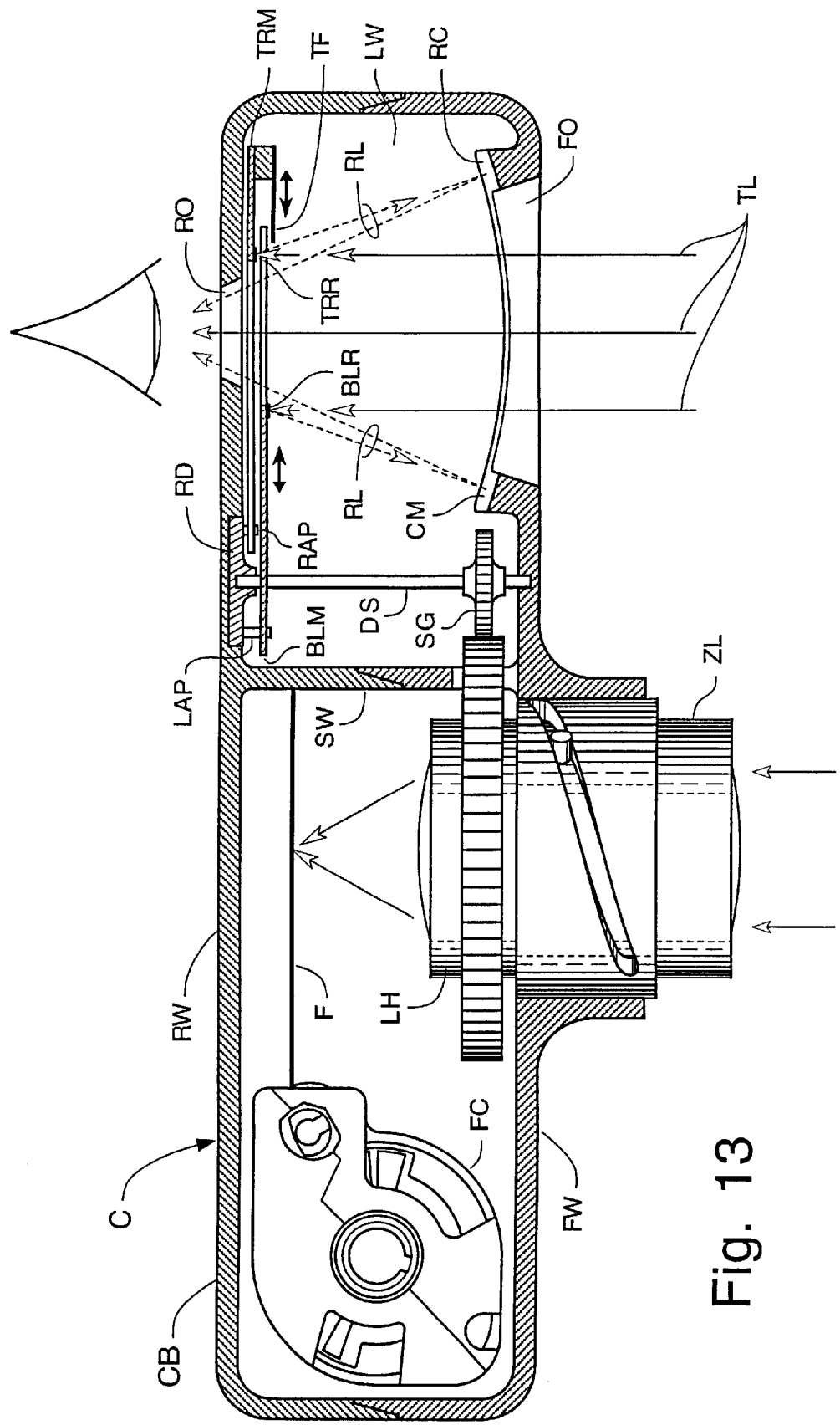
FIG. 13 is a horizontal sectional view of a camera with zoom capability which also employs my lensless viewfinder invention with corresponding changeable reticle size.

Refer now to FIG. 13 in combination with FIG. 14 to see a variable-reticle lensless-viewfinder zoom-lens camera generally designated C including a camera body CB with a front wall FW, a rear wall RW, a lens assembly ZL in the front wall FW and containing a suitable holder for a film cassette FC and suitable film advance mechanism (unshown) to advance film F behind the lens ZL for exposure upon operation of a suitable shutter(unshown) under the control of shutter release SR of FIG. 12. The design of taking lens assemblies, shutter mechanisms and film advances for cameras are well known and will be selected in accordance with well known design principles in the photographic industry therefore are not illustrated here.

The viewfinder of this embodiment is contained within the opaque camera body CB in the chamber defined by the exterior walls of the camera body CB and the interior side wall SW and lower wall LW with a rear opening RO in the camera rear wall RW, a front opening FO in the camera front wall FW, and a concave mirror RC similar to the embodiment of FIG. 4. The reticle RT of FIGS. 4–6 is, however, replaced by an adjustable or movable reticle which changes in size with changes in focal length of the lens assembly ZL.

The reticle of this embodiment is, preferably, formed from two relatively movable masks, designated for convenience based upon their relative location in the embodiment of FIGS. 14, 16, 18 and 20 as the bottom left reticle BLR on the bottom left mask BLM, and the top right reticle TRR located on the top right mask TRM. The two masks BLM and TRM are each notched to define a variable size rectangular opening when superimposed and moved in diagonally opposing directions of the double ended arrow in FIG. 14. The L-shaped inner edges of the notches of the respective masks BLM and TRM facing the front opening FO, have a bright or reflective surface similar to the corresponding surfaces of the embodiment of FIG. 4 to be distinguishable from the normal black background of the interior of the camera body CB. The masks BLM and TRM each include a clearance hole GS and an actuator pin slot APS. The actuator pin slots APS each engage a respective actuator pin left LAP or right RAP of FIGS. 13, 16, 18 and 20 on a rotating disc RD to move the two masks BLM and TRM simultaneously in opposite directions to open or close the reticle formed by the visible reticle surfaces BLR and TRR.

Movement of the actuator pins LAP and RAP is accomplished since they are connected to a regulating disc RD which is rotatably mounted for rotation within a recessed cylindrical cavity in the rear wall RW of the camera body CB. The regulating disc RD is coupled to the lens mechanism by any one of a number of gear or linkage mechanisms. Suffice it to say, the masks BLM and TRM are both coupled to the zoom adjustment of lens assembly ZL for coordinated movement therewith. Further, the overall position of the mask mechanism can be collectively shifted to compensate for parallax errors when close focusing, and differentially shifted to accommodate various aspect ratios.

In FIG. 13 the eye of the user is indicated adjacent to the rear opening RO, and ambient light, from the scene to be photographed, is indicated by the parallel lines TL with the outermost two lines indicating the light rays striking the reticle surfaces BLR and TRR. Light reflected from the surface RC of the concave mirror CM from the reticle and to the user's eye is illustrated by the thin dashed lines of FIG. 13.

Figure 17:
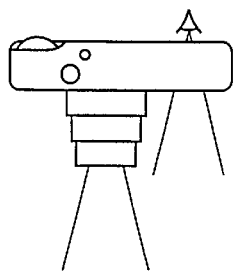
FIG. 17 is a reduced size top plan view of a camera of this invention in the normal focal-length lens and viewfinder position.
Figure 18:
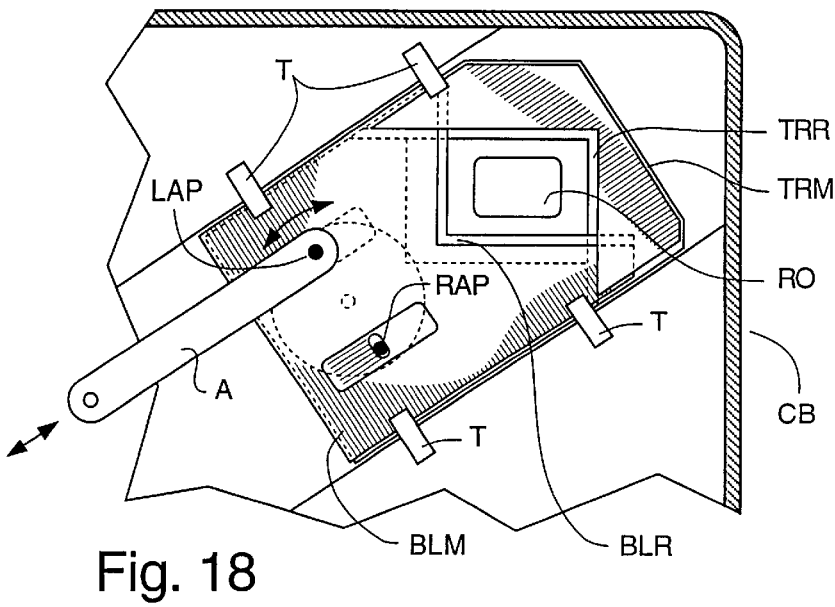
FIG. 18 is a fragmentary front elevational view of the changeable aperture feature of my lensless viewfinder on the camera of FIG. 13 when in a normal focal-length configuration.
Figure 19:
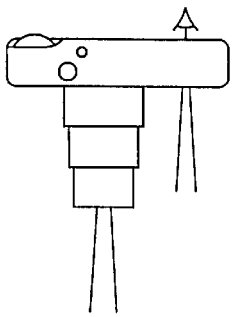
FIG. 19 is a reduced size top plan view of a camera of this invention in the telephoto lens and viewfinder position.
Figure 20:
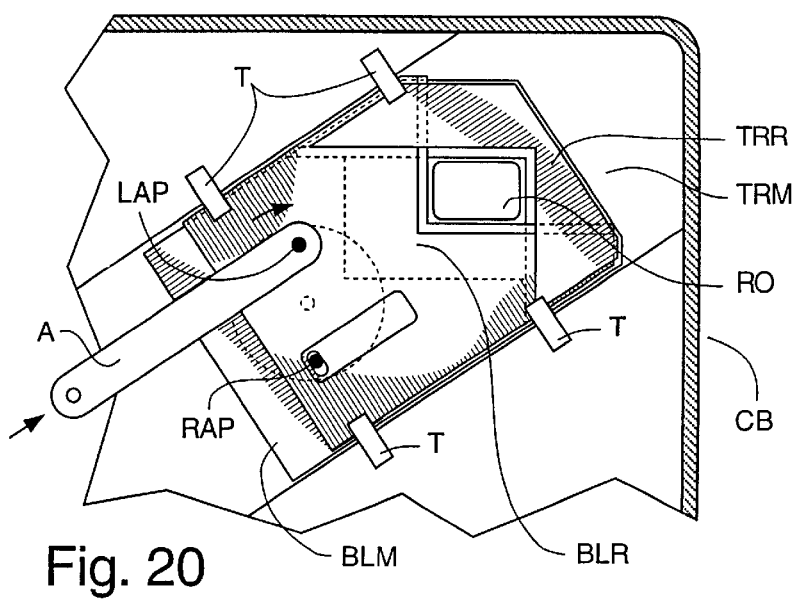
FIG. 20 is a fragmentary front elevational view of the changeable aperture feature of my lensless viewfinder on the camera of FIG. 13 when in a telephoto configuration.

The operation of this invention in a zoom or selective focal length camera is illustrated in FIGS. 13–20. FIGS. 15, 17 and 19 are simplified top views of the same camera C in a wide angle, normal and telephoto adjustment, respectively. Each of these figures show the matching horizontal fields of view for the camera taking lens ZL and for the viewfinder. The change in focal length of the taking lens is indicated by the degree of extension of the lens while the adjustment of the viewfinder is totally within the camera C as described above in connection with FIGS. 13 and 14. More precise showing of the change of positions of the masks BLM and TRM and the change in sizes of the reticle is illustrated in FIGS. 16, 18 and 20. In these figures, the masks BLM and TRM are shown as secured for sliding movement under tabs T which preferably are molded integrally as a part of the rear wall RW of the camera body CB. Movement of the masks BLM and TRM is in the direction of the arrows of the respective drawings. The relative position of the regulating disc RD and its extent of rotation for each lens position is indicated by the position of the actuator pins LAP and RAP.

An alternate method of coupling the viewfinder reticle adjustment mechanism to the lens assembly is shown in FIGS. 16, 18 and 20. It includes an actuator arm A with one end coupled to actuator pin LAP and the other end including an attachment means for coupling arm A to the lens zoom adjustment mechanism(unshown) to be moved in the direction of the arrows as the lens zooms.

In comparing FIGS. 16, 18 and 20, note the change in extent of overlapping of the masks BLM and TRM, with corresponding change in size of the reticle of the viewfinder.

The above described embodiments of the present invention are merely descriptive of its principles and are not to be considered limiting. The scope of the present invention instead shall be determined from the scope of the following claims including their equivalents.

I claim:

1. A viewfinder for use by a user to see a desired scene comprising:

an opaque hollow body including a front wall and a rear wall;

a viewfinder opening in said front wall;

an eyepiece opening in said rear wall;

said front wall viewfinder opening and said rear wall eyepiece opening generally defining the field of view of the viewfinder;

a reticle defining means within said hollow body facing said front wall;

a concave mirror surrounding said viewfinder opening of said front wall directed at said reticle defining means;

whereby said concave mirror produces an image of thee reticle defined by said reticle defining means, the image of the reticle being visible through said eyepiece opening and appearing within the field of view of a user's eye looking through said viewfinder;

said viewfinder constituting an open hole defined by said opaque hollow body.

2. A viewfinder in accordance with claim 1 wherein said reticle defining means is a metallized coating on said rear wall.

3. A viewfinder in accordance with claim 1 wherein said concave mirror is a metallized coating on said front wall.

4. A viewfinder In accordance with claim 1 wherein said front opening comprises a number of openings.

5. A viewfinder in accordance with claim 1 wherein said concave mirror is a thin strip generally surrounding said front opening and spaced from the rest of the front wall by a series of struts with perimeter openings therebetween, whereby portions of a scene in front of the viewfinder outside of said concave mirror may be viewed by a user through the perimeter openings in the area of the struts outside of said eyepiece opening and said viewfinder front opening in said front wall.

6. A lensless viewfinder camera having a taking lens aimed in a direction for use by a user viewing a subject through the viewfinder comprising:

an opaque camera body defining a front wall and a rear wall and enclosing taking lens means facing in a direction, shutter and film advance means therein;

said opaque camera body defining a viewfinder opening in said front wall facing generally in the same direction as the taking lens means of the camera;

said opaque camera body defining an eyepiece opening in the rear wall thereof;

said front viewfinder opening and said rear wall eyepiece opening defining the field of view of the viewfinder;

said opaque camera body including a wall extending from said rear wall to said front wall sealing said viewfinder from said taking lens means, shutter and film advance means;

means within said opaque camera body facing said front wall viewfinder opening between said eyepiece opening and viewfinder opening outside of the viewfinder field of view defining a reticle;

and means within said opaque camera body between said viewfinder opening and said eyepiece opening outside of The field of view of the viewfinder for reflecting an image of said reticle visible through said eyepiece opening;

said viewfinder defining an optical path through said viewfinder opening from a user's eye to a subject, through said opaque camera body, in which said viewfinder of said opaque camera body is free from the presence of glass or plastic optically refractive elements.

7. A lensless viewfinder camera in accordance with claim 6 wherein said reflecting means comprises a concave mirror at least partially surrounding said viewfinder opening of said camera body.

8. A lensless viewfinder camera in accordance with claim 6 wherein said reflecting means comprises a metallized coating on the inner side of said front wall of said camera body.

9. A lensless viewfinder camera in accordance with claim 6 wherein said viewfinder opening in said front wall comprises a number of small holes.

10. A lensless viewfinder camera in accordance with claim 9 wherein said camera body spaces said front wall close enough to a user's eye so that said discrete openings are out of focus to a user, and together the discrete openings present the appearance of a single viewfinder opening when a user is viewing a subject through the viewfinder.

11. A lensless viewfinder camera in accordance with claim 6 wherein said means for defining said reticle comprises a portion of the inner side of said rear wall of said camera body.

12. A lensless viewfinder camera in accordance with claim 6 wherein said means defining a reticle comprises a metallized portion of said camera body surrounding said eyepiece opening.

13. A lensless viewfinder camera in accordance with claim 12 wherein said reticle image reflecting means comprises a generally rectangular frame portion of said camera body to define a substantially continuous rectangle around said viewfinder opening; and support means spacing said rectangular frame from the remainder of said camera body.

14. A lensless viewfinder camera in accordance with claim 13 wherein said support means comprises a series of struts integral with said camera body.

15. A camera for use by a photographer to photograph a subject within the field of view comprising:

a camera body;

a viewfinder;

a taking lens assembly defining a field of view to be photographed; and means for capturing an image by said taking lens assembly;

wherein said viewfinder is defined by said camera body including;

a first opening in said camera body on the same side thereof as said taking lens assembly;

a second opening in said camera body on the opposite side thereof from said taking lens assembly defining an eyepiece opening for said camera;

said camera body including said first and second openings defining a viewfinder with substantially the same field of view as of the taking lens assembly;

means within said camera body defining a reticle in said viewfinder substantially surrounding said second opening; and reflective means within said camera body outside of the field of view of the viewfinder and within the field of view of a user's eye directed at said reticle for reflecting an image of said reticle visible through said second opening.

16. A camera in accordance with claim 15 wherein said reticle is defined by an inner wall of said camera body facing said first opening.

17. A camera in accordance with claim 15 wherein said reflective means comprises a concave mirror focussed on said reticle.

18. A camera in accordance with claim 15 wherein said reflective means comprises a metallized surface on the portion of said camera body defining said first opening.

19. A camera in accordance with claim 18 wherein said metallized surface surrounds said first opening within said camera body.

20. A camera in accordance with claim 15 wherein said camera body defines a wall extending from said same side as said first opening to said opposite side thereof for optically isolating said viewfinder from said taking lens assembly and image capture means of said camera.

21. In a camera for use by a user to photograph a scene comprising:

a camera body having a front and rear face;

an adjustable focal length lens assembly on the front of said camera body;

a shutter and shutter release assembly;

a film compartment;

a film advance assembly; and a viewfinder;

the improvement therein wherein said viewfinder is defined by said camera body and includes:

a first opening in said camera body on the front face thereof;

a second opening in said camera body on the rear face of said camera body, said second opening defining an eyepiece opening for said camera;

said first opening and said second opening defining the field of view of the viewfinder;

means defining a reticle for said viewfinder;

said reticle defining means comprising at least two relatively movable members including reticle defining surfaces within said camera body and having controllable degree of separation of the reticle defining surfaces to vary the dimensions of said reticle;

means for moving said relatively movable members; and reflective means in said camera body outside of the field of view of the viewfinder for reflecting an image of said reticle to a user through said second opening.

22. The combination in accordance with claim 21 including means for coupling said reticle defining means to said adjustable focal length lens assembly for changing of reticle size related to changes in the focal length of adjustable focal length lens assembly.

23. The combination in accordance with claim 21 wherein said relatively movable reticle defining members are two in number and each of said members includes two adjacent perpendicular edges of a rectangular reticle and one corner thereof and said members together define the third and fourth diagonally opposite corners of said reticle.

24. The combination in accordance with claim 23 wherein said movable surfaces include a reflecting reticle on a contrasting background.

25. The combination in accordance with claim 24 wherein said contrasting background of said surfaces correspond to the background color of the interior of said camera body in the region of said viewfinder.

26. In a camera for use by a user comprising:

a camera body having a front and rear face;

a taking lens assembly on the front of said camera body;

image capture means; and a viewfinder;

wherein said viewfinder is defined by said camera body and includes:

a first opening in said camera body on the front face thereof;

a second opening in said camera body on the rear face of said camera body, said second opening defining a user viewing opening for said camera;

means defining a reticle for said viewfinder; and reflective means for reflecting an image of said reticle to a user in the region of said second opening;

the improvement therein said reticle defining means comprises:

a portion of said camera body having a first surface facing said reflective means; and support means for positioning said reflective means spaced from the remainder of said camera body to allow the viewing of a portion of the scene surrounding the image of the reticle.

27. The combination in accordance with claim 26 wherein said support means comprise a plurality of struts which connect the camera body to said reflective means at spaced locations around the periphery of said reflective means.

* * * * *